US011447610B2

(12) United States Patent
Hou et al.

(10) Patent No.: US 11,447,610 B2
(45) Date of Patent: Sep. 20, 2022

(54) TRANSPARENT COMPOSITE FILM AND FLEXIBLE DISPLAY DEVICES INCLUDING THE SAME

(71) Applicant: CORNING INCORPORATED, Corning, NY (US)

(72) Inventors: Jun Hou, Painted Post, NY (US); Kevin Robert McCarthy, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 324 days.

(21) Appl. No.: 16/607,634

(22) PCT Filed: Apr. 26, 2018

(86) PCT No.: PCT/US2018/029560
§ 371 (c)(1),
(2) Date: Oct. 23, 2019

(87) PCT Pub. No.: WO2018/200805
PCT Pub. Date: Nov. 1, 2018

(65) Prior Publication Data
US 2020/0299471 A1    Sep. 24, 2020

Related U.S. Application Data

(60) Provisional application No. 62/490,342, filed on Apr. 26, 2017.

(51) Int. Cl.
| | |
|---|---|
| *C08J 5/04* | (2006.01) |
| *C08J 5/18* | (2006.01) |
| *C08F 22/20* | (2006.01) |
| *C08L 35/02* | (2006.01) |
| *D03D 15/267* | (2021.01) |

(52) U.S. Cl.
CPC ............ *C08J 5/043* (2013.01); *C08F 22/20* (2013.01); *C08J 5/18* (2013.01); *C08L 35/02* (2013.01); *C08J 2335/02* (2013.01); *C08L 2201/10* (2013.01); *C08L 2203/16* (2013.01); *C08L 2203/20* (2013.01); *D03D 15/267* (2021.01)

(58) Field of Classification Search
CPC ... C08J 5/043; C08J 5/18; C08L 35/02; C08F 22/20; D03D 15/001
See application file for complete search history.

(56) References Cited

U.S. PATENT DOCUMENTS

| | | | |
|---|---|---|---|
| 4,387,129 A | 6/1983 | Vincent | |
| 6,235,842 B1 * | 5/2001 | Kuwano | ................. C08L 71/00 525/119 |
| 7,132,154 B2 | 11/2006 | Shibahara et al. | |
| 7,250,209 B2 | 7/2007 | Shibahara et al. | |
| 8,372,504 B2 | 2/2013 | Bae et al. | |
| 9,062,176 B2 | 6/2015 | Kishimoto et al. | |
| 9,417,472 B2 | 8/2016 | Yoon et al. | |
| 2012/0269990 A1 | 10/2012 | Sim et al. | |
| 2016/0009882 A1 | 1/2016 | Yoon et al. | |
| 2017/0294495 A1 | 10/2017 | Shyu et al. | |

FOREIGN PATENT DOCUMENTS

| | | |
|---|---|---|
| CN | 105492509 A | 4/2016 |
| JP | 2003286390 A | 10/2003 |
| KR | 20100127080 A | 12/2010 |

OTHER PUBLICATIONS

Choi et al; "Polymers for Flexible Displays: From Material Selection to Device Applications" ; Prog. Polym. Sci. 33 (2008) pp. 581-630.
International Search Report and Written Opinion of the International Searching Authority; PCT/US2018/029560; dated Jul. 23, 2018; 11 Pages; European Patent Office.
Chinese Patent Application No. 201880028141.0, Office Action dated Dec. 1, 2021, 8 pages (4 pages of English Translation and 4 pages of Original Document), Chinese Patent Office.

* cited by examiner

*Primary Examiner* — Robert D Harlan
(74) *Attorney, Agent, or Firm* — Jeffrey A. Schmidt

(57) ABSTRACT

Described herein are articles and methods of making articles, including a transparent composite film having a fiber filler embedded in a polymer network. The polymer network of the transparent composite film is a cured, cross-linked matrix including a first and second structure segment. The structure segments may contribute or impart improved properties in the transparent composite film. The select structure segments can provide increased modulus and reduced glass transition temperature thereby allowing for a desirable balance of flexibility and rigidity in the transparent composite film. The improved transparent composite film is suitable for many applications including use in display devices.

31 Claims, 5 Drawing Sheets

TRANSPARENT COMPOSITE FILM AND FLEXIBLE DISPLAY DEVICES INCLUDING THE SAME

CROSS-REFERENCE TO RELATED APPLICATIONS

This application is a national stage entry of International Patent Application Serial No. PCT/US2018/029560, filed on Apr. 26, 2018, which in turn, claims the benefit of priority under 35 U.S.C. § 119 of U.S. Provisional Application Serial No. 62/490,342 filed on Apr. 26, 2017, the contents of each of which are is relied upon and incorporated herein by reference in their entireties.

FIELD

The present disclosure relates generally to articles including and methods for making transparent composite films and, more particularly, to articles including and methods for making transparent composite films containing a fiber filler embedded in a resin matrix having hard and soft structure segments.

BACKGROUND

Interests in flexible displays have been growing in recent years driven by desire for thin, lightweight, rugged, curved, or foldable, displays with the potential of a large screen and portability. Another reason for pursuing flexible displays is the possibility of using high volume roll-to-roll manufacturing processes to reduce product and manufacturing cost. Although metal and glass are viable candidate materials for the development of flexible displays, polymeric materials are attractive because they are flexible, rugged, and compatible with roll-to-roll manufacturing processes. However, to replace glass with a polymer substrate, the polymers should mimic the properties of glass, including, among other things, high transmittance, high operating temperature and low coefficients of thermal expansion in addition to achieving superior flexibility (e.g., the ability to bend over an 1" diameter, and unbend, cyclically 1000 times) (Myeon-Cheon Choi, etc. in Prog. Polym. Sci. 33 (2008) 581-630).

Many plastic films have been evaluated for applications in flexible displays, including polyimide, polyethylene terephthalate, polyethylene naphthalate, polyarylate, cyclic olefin copolymer and polyethersulphone. However, many plastic films have drawbacks. A high coefficient of thermal expansion, relative to glass or silicon, is an example of one drawback of plastic materials. Polyimide has an acceptable coefficient of thermal expansion, but suffers from high birefringence and yellowness issues along with high cost related to high temperature and long processing time.

To overcome the above drawbacks, efforts have been made to incorporate a reinforcing filler material into a designed resin matrix to form composite materials. Among the reinforcing filler materials, various glass fillers have been mixed into a resin matrix to fabricate transparent composite films with improved physical and thermal properties.

U.S. Pat. No. 8,372,504 discloses a transparent composite composition including a glass filler dispersed in a cross-linked transparent siloxane resin produced by a non-hydrolytic reaction and having improved transparency and heat resistance, and a low thermal expansion coefficient. However, a condensation reaction is involved which results in the generation of volatile organic compounds and water as by-products. Moreover, an additional curing step is performed at 200° C. for 4 hours.

U.S. Pat. No. 7,250,209 discloses a transparent composite composition including a glass fiber cloth filler impregnated with a copolymer of (meth)acrylate having two or more functional groups and at least one acrylate selected from among sulfur-containing acrylates and fluorene skeleton-containing acrylates. The transparent composite composition has a low coefficient of thermal expansion and improved transparency, heat and solvent resistance. However, the transparent resin matrix has a glass transition temperature, Tg, above 150° C. and the transparent composite is made by a UV cure as well as long thermal treatments at high temperatures.

U.S. Pat. No. 7,132,154 discloses a transparent composite composition including epoxy resins and a glass fiber filler. The transparent composite composition has low a coefficient of thermal expansion, and improved transparency, heat and solvent resistance. However, the cured epoxy resin matrix has a Tg above 150° C. and the transparent composite is made by long thermal treatments at high temperatures.

U.S. Pat. No. 9,062,176 discloses a composite film formed by impregnating a resin composition containing cyanate ester resin and low refractive index resin into a glass fiber base material. Although the composite film has improved transparency, its preparation involves the use of organic solvents, and heating and pressing are preferably made at a raised temperature of 150° C. to 200° C. In addition, the cured resin composition has a Tg above 170° C.

U.S. Pat. No. 9,417,472 discloses a method for manufacturing a transparent glass-fabric reinforced polyimide film for flexible displays. The composite film has enhanced thermal and mechanical properties. However, both high processing temperature and long processing time are needed to complete the polymerization and imidization reactions. In addition, the use of organic solvents and generation of volatile by-products leads to differential shrinkage between the thinner part and the thicker part of the woven glass fabric, resulting in a roughened surface. In order for the glass-fabric reinforced polyimide film to be effectively used as a flexible display substrate, a flattening method is needed to reduce the surface roughness, as disclosed by U.S. Patent Publication No. 2016/0009882.

As can be seen from the above examples, composite compositions designed to reduce the coefficient of thermal expansion and improve other physical and thermal properties to date have drawbacks due to one or more of the following reasons: (1) use or generation of organic or water molecules that are difficult to remove completely from the composite product, which can compromise product performance such as long-term stability and dimensional stability, (2) need for long and high temperature treatments to complete chemical reactions, which increases the cost, hinders the throughput, and in some cases causes discoloration, (3) need for processes that are incompatible with roll-to-roll manufacturing, which is unfavorable in terms of cost and volume of supply, and (4) use of rigid resin matrices that have a high glass transition temperature, which can lead to limited flexibility of the composite product, product discoloration, cracking and delamination at the interface between the resin matrix and the glass fillers due to inadequate adhesion.

To effectively address the above limitations, new solutions are needed to simultaneously achieve improved transmittance, thermal stability, dimensional stability, superior flexibility and other desirable properties in a process that can be carried out at low temperatures and in high volume without involving the use or generation of volatile species such as water and small organic compounds (e.g., organic solvents).

SUMMARY

In light of the above, there is a need for a transparent composite film that can be produced at low temperatures without utilizing or generating volatile species, for example, water or small organic compounds during production of the transparent composite film, or without the need for secondary high temperature treatments. The transparent composite films can be useful as a display or optical device, or as an element, for example, a cover window, substrate, protective layer and adhesive layer in various flexible, foldable (including bendability to a small radius, for example a few millimeters), and wearable (wherein biaxial flexure may be desirable) displays, such as liquid crystal display, electrophoretic display and organic light emitting diode display. The present disclosure describes methods to produce transparent composite films that exhibit an improved combination of transparency, flexibility, reduced coefficient of thermal expansion, increased heat resistance and reduced surface roughness. The improved transparent composite film is produced by embedding a fiber filler, e.g., glass fibers, in a polymer network having select structure segments that provide increased modulus of elasticity and reduced glass transition temperature thereby allowing for a desirable balance of flexibility and rigidity, particularly for foldable displays in which rigidity gives good puncture resistance, and flexibility gives the ability to fold to a small bend radius, for example a few millimeters.

In a first aspect, there is a transparent composite film comprising a fiber filler embedded in a cross-linked polymer network, the network comprising a combination of a first structure segment of formula (1) or formula (2):

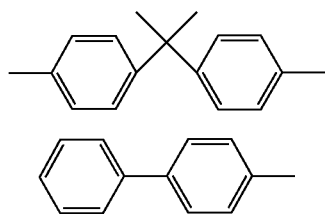

(1)

(2)

and a second structure segment of formula (3) or formula (4):

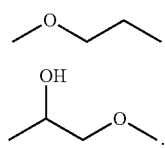

(3)

(4)

In some examples of aspect 1, the fiber filler comprises quartz fibers.

In another example of aspect 1, the fiber filler comprises a fabric of glass fibers.

In another example of aspect 1, the fiber filler comprises a woven fabric of glass fibers.

In another example of aspect w, the fabric has an average thickness of about 200 µm or less and the glass fibers comprise an average diameter of about 25 µm or less.

In another example of aspect 1, the second structure segment of formula (3) or formula (4) further comprises at least one functional group.

In another example of aspect 1, the second structure segment of formula (3) or formula (4) further comprises a functional group selected from the group consisting of acrylate, methacrylate, epoxide or a combination thereof In another example of aspect 1, the transparent composite film has an average thickness in the range of about 20 to about 500 µm.

In another example of aspect 1, the transparent composite film comprises a first surface, the first surface has an average surface roughness Ra of about 50 nm or less.

In another example of aspect 1, the transparent composite film has an average linear coefficient of thermal expansion of 20 ppm or less within the temperature range of 20° C. to 250° C.

In another example of aspect 1, the transparent composite film has a glass transition temperature of about 80° C. or less.

In another example of aspect 1, the fiber filler is a woven fabric of glass fibers and the fabric has an average thickness of about 15% or more of the average total thickness of the transparent composite film.

In another example of aspect 1, the fiber filler is a woven fabric of glass fibers and the average total thickness of the transparent composite film is about 5% or more greater than the average thickness of the fabric.

In another example of aspect 1, the transparent composite film has a transmission of about 80% or more to light with a wavelength of 550 nm. In another example of aspect 1, the transparent composite film has a tensile strength of about 30 MPa or more.

In another example of aspect 1, the transparent composite film has a modulus of elasticity of about 500 MPa or more.

In another example of aspect 1, the transparent composite film has an elongation at break of 3% or more.

In a second aspect, the cross-linked polymer network of the transparent composite film of aspect 1 is obtained from a thermal or radiation cure of a composition comprising:
a first oligomer comprising a refractive index lower than that of the fiber filler;
a second oligomer comprising a refractive index higher than that of the first oligomer; and
a monomer comprising a refractive index higher than that of the fiber filler,
wherein the refractive index difference between the transparent cross-linked polymer network and the fiber filler is ≤about 0.01.

In some examples of aspect 2, at least one of the first oligomer, the second oligomer or the monomer of the composition used to obtain the cross-linked polymer network comprises the first structure segment of formula (1) or formula (2).

In another example of aspect 2, the first oligomer, the second oligomer and the monomer of the composition used to obtain the cross-linked polymer network comprises the first structure segment of formula (1) or formula (2).

In another example of aspect 2, at least one of the first oligomer, the second oligomer or the monomer used to obtain the cross-linked polymer network comprises the second structure segment of formula (3) or formula (4).

In another example of aspect 2, the first oligomer, the second oligomer and the monomer of the composition used to obtain the cross-linked polymer network comprises the first structure segment of formula (3) or formula (4).

In another example of aspect 2, the composition used to obtain the cross-linked polymer network comprises the first oligomer of a compound of formula (5):

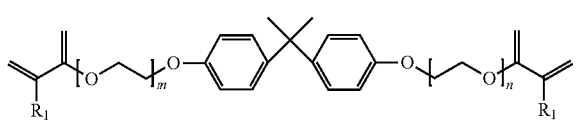

(5)

wherein m=3 to 8, m+n=5 to 16, and $R_1$=H or methyl.

In another example of aspect 2, the composition used to obtain the cross-linked polymer network comprises the second oligomer of a compound of formula (6):

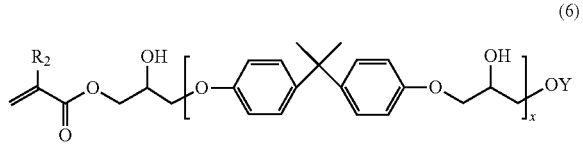

(6)

wherein x=0 to 2, $R_2$=H or methyl, and Y is a compound of formula (7) or (8)

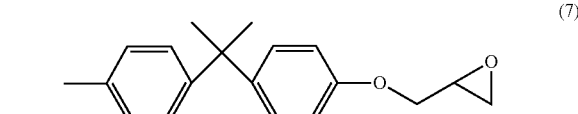

(7)

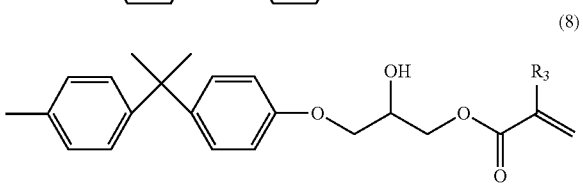

(8)

wherein $R_3$ is H or methyl.

In another example of aspect 2, the composition used to obtain the cross-linked polymer network comprises the monomer of a compound of formula (9):

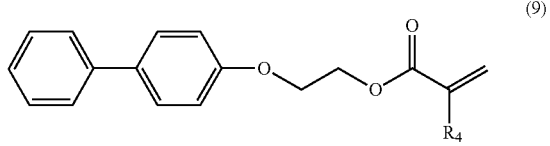

(9)

wherein $R_4$ is H or methyl.

In another example of aspect 2, the monomer is mono functional.

In another example of aspect 2, the composition comprises about 30 to about 80 weight percent of the first oligomer, about 10 to about 35 weight percent of the second oligomer and about 10 to about 35 weight percent of the monomer, wherein the weight percent of the first oligomer, the weight percent of the second oligomer, and the weight percent of the monomer, are each based on the total weight of the composition.

In another example of aspect 2, the composition comprises a weight ratio of the first oligomer to the second oligomer in the range of 8:1 to 1:1.

In another example of aspect 2, the composition comprises a weight ratio of the first oligomer to the monomer in the range of 8:1 to 1:1.

In another example of aspect 2, the composition comprises a weight ratio of the second oligomer to the monomer in the range of 3:1 to 1:3.

In another example of aspect 2, the composition further comprises about 0.5 to about 3 weight percent of a curing agent.

In another example of aspect 2, the composition is free of water.

In another example of aspect 2, the composition is free of organic solvent.

In another example of aspect 2, the composition has a viscosity of about 200 poise or less at 25° C.

In a third aspect, there is a consumer electronic product comprising a housing having a front surface, a back surface and side surfaces; electrical components provided in or at least partially within the housing, the electrical components including at least a controller, a memory, and a display, the display being provided at or adjacent the front surface of the housing, and a cover material disposed over the display, wherein at least one of a portion of the housing or the cover material comprises a transparent composite film, for example, the transparent composite film of aspect 1 or 2 above.

Any one of the above aspects (or examples of those aspects) may be provided alone or in combination with any one or more of the examples of that aspect discussed above; e.g., the first aspect may be provided alone or in combination with any one or more of the examples of the first aspect discussed above; and the second aspect may be provided alone or in combination with any one or more of the examples of the second aspect discussed above; and so-forth.

The accompanying drawings are included to provide a further understanding of principles of the disclosure, and are incorporated in and constitute a part of this specification. The drawings illustrate some examples(s), and together with the description serve to explain, by way of example, principles and operation thereof. It is to be understood that various features disclosed in this specification and in the drawings can be used in any and all combinations. By way of non-limiting example the various features may be combined with one another as set forth in the specification, above, as aspects.

BRIEF DESCRIPTION OF THE DRAWINGS

The above and other features, examples and advantages of aspects of the examples disclosed in the present specification are better understood when the following detailed description thereof is read with reference to the accompanying drawings, in which.

DETAILED DESCRIPTION

Figure 1:
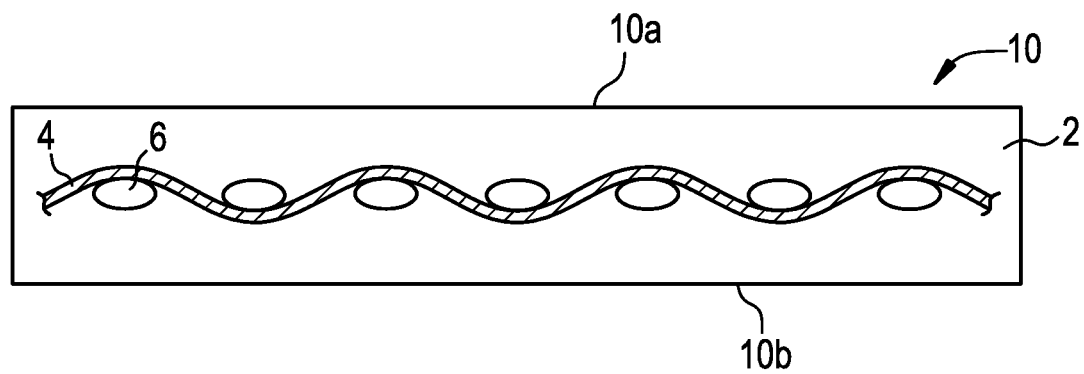
FIG. 1 is a cross-section view of a transparent composite film according to one or more embodiments.

Examples will now be described more fully hereinafter with reference to the accompanying drawings. Whenever possible, the same reference numerals are used throughout the drawings to refer to the same or like parts. However, the claimed subject matter may be embodied in many different forms and should not be construed as limited to the examples set forth herein.

Directional terms as used herein (e.g., up, down, right left, front, back, top, bottom) are made only with reference to the figures as drawn and are not intended to imply absolute orientation.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The present disclosure provides a transparent composite film having improved transparency to visible light. For example, the transparent composite film has a light transmissivity at the wavelength of 550 nm of about 80% or more, for example about 85% or more, or about 90% or more. In one example, the transparent composite film can be used in the production of display device substrates, and the transmissivity can be about 85% or more. In one or more embodiments, the transmissivity of the transparent composite film can being in the range of about 80% to about 95%, about 85% to about 90% or about 91, 92 or 93%, including any ranges and subranges therebetween.

The transparent composite film can have a glass transition temperature, Tg, of about 80° C. or less, for example about 70° C. or less, or about 60° C. or less, or about 50° C. or less, or about 40° C. or less, or about 30° C. or less. In one or more embodiments, the glass transition temperature can be in the range of about 20° to about 80° C., about 30° to about 70° C. or about 40°, 50° or 60° C., including any ranges and subranges therebetween. The low glass transition temperature provides increased flexibility to the transparent composite.

In one or more embodiments, the transparent composite film includes a fiber filler embedded in a polymer network having a first structure segment and a second structure segment.

To provide excellent transparency in the transparent composite film, the polymer network has a refractive index different from the refractive index of the fiber filler by about 0.01 or less, for example about 0.008 or less, or about 0.005 or less. When the difference in refractive index of the polymer network and fiber filler is greater than 0.01, the resultant transparent composite film may show an insufficient or degraded transparency for use in display devices.

In one or more embodiments, the transparent composite film can have one or more improved properties. For example, the transparent composite film can have an average linear coefficient of thermal expansion, CTE, of about 20 ppm or less, for example about 15 ppm or less, or about 10 ppm or less within a temperature range of 20° to 250° C. In another example, the transparent composite film can have a tensile strength of about 30 MPa or more, a modulus of about 500 MPa or more, an elongation at break of about 3% or more, or any combination thereof The fiber filler of the transparent composite film can include any suitable fiber filler. In some embodiments, the fiber filler has a low thermal expansion coefficient or contributes to a transparent composite film having a low thermal expansion coefficient. Examples of a fiber filler include glass fibers, glass cloths, woven glass fiber fabric, nonwoven glass fiber fabrics and other glass fiber cloths or quartz fibers. Among them, glass fibers, glass cloths, woven and nonwoven glass fiber fabrics are beneficial in view of their being highly effective in reducing the coefficient of linear expansion.

In one or more embodiments, the fiber filler includes glass (e.g., glass fiber). The glass can include glass species, for example, non-alkali glass, E glass, C glass, A glass, S glass, D glass, NE glass, T glass, quartz, low inductivity glass, and high inductivity glass.

The refractive index of the fiber filler incorporated in the transparent composite film of the present disclosure is not restricted. For example, glass fiber can have a refractive index in the range of about 1.46 to about 1.57. The refractive index of the polymer network to be used with the fiber filler may be adjusted. The fiber filler advantageously may have a refractive index of about 1.54 to about 1.57, for example about 1.55 to about 1.56, or about 1.55 to about 1.57, or about 1.54 to about 1.56, including any ranges and subranges therebetween. The use of fiber filler having the refractive index in the above ranges provides a transparent composite film with excellent visibility.

The fiber filler is embedded in the polymer network having a first structure segment and a second structure segment. The first structure segment can impart increased modulus and contributes to improved strength, puncture resistance, refractive index and dimensional stability. The second structure segment can impart a reduced glass transition temperature and enhanced flexibility for the transparent composite film. In some embodiments, the transparent composite film may be used as a cover material for a foldable electronic device in which the typically diametrically opposed attributes of puncture resistance and bendability to a small radius are both desirable. The transparent composite film can be designed to achieve both a good puncture resistance and bendability to a small bend radius (for example about a few millimeters or less, for example about 3 mm or less, or about 2 mm or less, or about 1 mm or less) by an appropriate mixture of the first and second structure segments. If there is too much of the first structure segment, the transparent composite film will not be flexible enough to achieve the tight bend radius. If there is too much of the second structure segment, the transparent composite film will be tacky and not hard enough to achieve a good puncture resistance.

In one or more embodiments, the first structure segment present in the polymer network can be a compound or combination of compounds of formula (1) or (2) shown below.

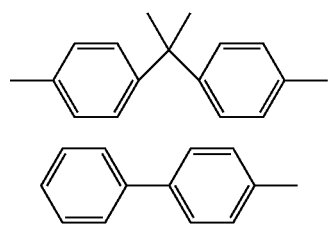

(1)

(2)

The first structure segment can be bonded to a second structure segment. In one or more embodiments, the second structure segment present in the polymer network can be a compound or combination of compounds of formula (3) or (4) shown below.

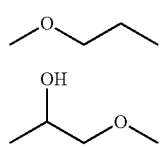

(3)

(4)

The second structure segment can be bonded to one or more functional groups. The functional group can include acrylate, methacrylate, epoxide or a combination thereof. The functional group can be part of the compound, for example, a monomer or an oligomer.

Materials used to form the polymer network may be any of those capable of crosslinking upon heating or exposure to radiation (e.g., actinic radiation). In one or more embodiments, the polymer network is obtained from curing a composition that includes a first oligomer, a second oligomer and a monomer.

A first oligomer can include a compound having a first structure segment, a second structure segment or a combination of a first and second structure segment as described in the present disclosure. For example, the first oligomer can contain a first structure segment of the compounds of formula (1) or (2). In some embodiments, the first oligomer contains a first structure segment of the compound of formula (1). In another example, the first oligomer can contain a second structure segment of the compounds of formula (3) or (4). In some embodiments, the first oligomer contains a second structure segment of the compound of formula (3). In yet another example, the first oligomer contains a first structure segment of the compounds of formula (1) or (2) and one or more second structure segments of the compounds of formula (3) or (4) (e.g., 2 to 16 second structure segments). In some embodiments, the first oligomer contains a first structure segment of the compound of formula (1) and two or more second structure segments of the compound of formula (3).

In one or more embodiments, the first oligomer can be a compound of formula (5) shown below.

(5)

wherein $m=3$ to 8, $m+n=5$ to 16, and $R_1=H$ or methyl.

In some embodiments, the first oligomer of the composition has a refractive index less than the refractive index of the fiber filler. For example, the first oligomer can have a refractive index less than the fiber filler in the transparent composite film. In one or more embodiments, the first oligomer can have a refractive index in the range of about 1.47 to about 1.54, about 1.48 to about 1.52 or about 1.49, 1.50 or 1.51, including any ranges and subranges therebetween.

A second oligomer can include a compound having a first structure segment, a second structure segment or a combination of a first and second structure segment as described in the present disclosure. For example, the second oligomer can contain a first structure segment of the compounds of formula (1) or (2). In some embodiments, the second oligomer contains a first structure segment of the compound of formula (1). In another example, the second oligomer can contain a second structure segment of the compounds of formula (3) or (4). In some embodiments, the second oligomer contains a second structure segment of the compound of formula (4). In yet another example, the second oligomer contains one or more first structure segments of the compounds of formula (1) or (2) and one or more second structure segments of the compounds of formula (3) or (4) (e.g., 1 to 3 first structure segments and 1 to 4 second structure segments). In some embodiments, the second oligomer contains two or more first structure segments of the compound of formula (1) and two or more second structure segments of the compound of formula (4).

In one or more embodiments, the second oligomer can be a compound of formula (6) shown below.

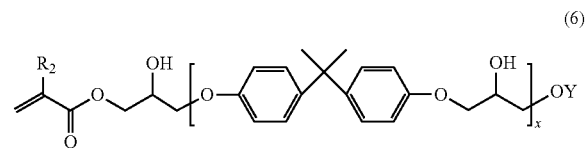

(6)

wherein $x=0$ to 2, $R_2=H$ or methyl, and Y is a compound of formula (7) or (8)

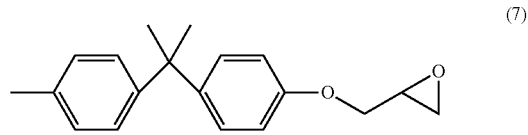

(7)

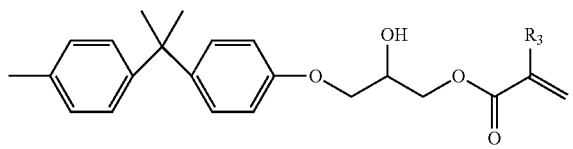

(8)

wherein R₃ is H or methyl.

In some embodiments, the second oligomer of the composition has a refractive index greater than the refractive index of the fiber filler. For example, the second oligomer can have a refractive index greater than the fiber filler in the transparent composite film. In one or more embodiments, the second oligomer can have a refractive index in the range of about 1.52 to about 1.57, about 1.53 to about 1.565 or about 1.54, 1.545, 1.55, 1.555 or 1.56, including any ranges and subranges therebetween.

A monomer can include a compound having a first structure segment, a second structure segment or a combination of a first and second structure segment as described in the present disclosure. For example, the monomer can contain a first structure segment of the compounds of formula (1) or (2). In some embodiments, the monomer contains a first structure segment of the compound of formula (2). In another example, the monomer can contain a second structure segment of the compounds of formula (3) or (4). In some embodiments, the monomer contains a second structure segment of the compound of formula (3). In yet another example, the monomer contains one or more first structure segments of the compounds of formula (1) or (2) and one or more second structure segments of the compounds of formula (3) or (4). In some embodiments, the monomer contains a first structure segment of the compound of formula (2) and a second structure segment of the compound of formula (3).

In one or more embodiments, the monomer can be a compound of formula (9) shown below.

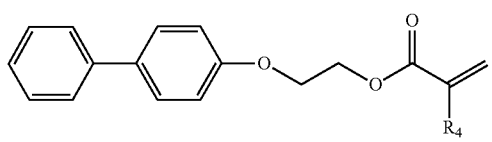

(9)

wherein R₄ is H or methyl.

In some embodiments, the monomer of the composition has a refractive index greater than the refractive index of the fiber filler. For example, the monomer can have a refractive index greater than the fiber filler in the transparent composite film. In one or more embodiments, the monomer can have a refractive index in the range of about 1.52 to about 1.59, about 1.53 to about 1.585 or about 1.54, 1.545, 1.55, 1.555, 1.56, 1.565, 1.57, 1.575 or 1.58, including any ranges and subranges therebetween.

The composition used to obtain the polymer network can include at least one of a first oligomer, a second oligomer and a monomer, for example, as described above. As used herein, weight percent of any particular component in the composition is based on the total weight of the composition. In one or more embodiments, the composition can contain about 30 to about 80 weight percent, for example about 30 to about 70 weight percent, or about 30 to about 60 weight percent, or about 30 to about 50 weight percent, or about 30 to about 40 weight percent, or about 40 to about 70 weight percent, or about 50 to about 70 weight percent, or about 60 to about 70 weight percent, or about 45, 50, 55, 60 or 65 weight percent, including any ranges and subranges therebetween, of a first oligomer or combination of first oligomers. In other embodiments, the composition can contain about 10 to about 35 weight percent, or about 15 to about 30 weight percent, or about 20 to 25 weight percent, or about 10 to 25 weight percent, or about 10 to 20 weight percent, or about 10 to 15 weight percent, or about 15 to about 35 weight percent, or about 20 to about 35 weight percent, or about 25 to about 35 weight percent, or about 30 to about 35 weight percent, of a second oligomer or combination of second oligomers. In other embodiments, the composition can contain about 10 to about 35 weight percent, about 15 to about 30 weight percent or about 20 or 25 weight percent, or about 10 to 25 weight percent, or about 10 to 20 weight percent, or about 10 to 15 weight percent, or about 15 to about 35 weight percent, or about 20 to about 35 weight percent, or about 25 to about 35 weight percent, or about 30 to about 35 weight percent, of a monomer or combination of monomers.

In one or more embodiments, the composition can include at least one first oligomer, at least one second oligomer and at least one monomer. In some embodiments, as used herein, the first oligomer and the second oligomer are not the same compound. In one example, the composition can include about 30 to about 80 weight percent of a first oligomer, about 10 to about 35 weight percent of a second oligomer and about 10 to about 35 weight percent of a monomer.

In one or more embodiments, the composition can include specific weight ratios of the first oligomer, second oligomer, monomer or combinations thereof. In some embodiments, the composition can include a weight ratio of the first oligomer to the second oligomer or monomer in the range of 8:1 to 1:1. In some embodiments, the composition can include a weight ratio of the second oligomer to the monomer or the monomer to the second oligomer in the range of 3:1 to 1:3. In other embodiments, the composition can include a weight ratio of first oligomer : second oligomer : monomer in the range of 8:1:1 to 1:1:1, or 8:3:1 to 1:3:1, or 8:1:3 to 1:1:3.

The composition can be cured to form a cross-linked polymer network. Available for crosslinking the components of the composition are methods that include inducing curing by means of actinic radiation or thermal polymerization by heating. The curing methods may be used in combination. For example, for the purpose of completing a polymerization reaction, and for advantageously lowering the coefficient of linear expansion, in some embodiments the step of curing by means of actinic radiation and/or thermal polymerization (e.g., application of heat) is not followed by further high temperature heat treatment, for example, raising the temperature of the cured composition above about 80° C., about 100° C. or 120° C. Radiation can include any suitable radiation source, for instance, ultraviolet light can be used as the actinic radiation source. Ultraviolet light can be generated with metal halide lamps, high-pressure mercury lamps, and the like.

In crosslinking/curing the oligomers and monomer composition by actinic radiation, for example by ultraviolet irradiation, a curing agent (e.g., radical-generating photopolymerization initiator) can be added to the composition. The curing agent can be present in the composition in an amount in the range of about 0.1 to about 3 weight percent, about 0.5 to about 2.5 weight percent or about 1, 1.5 or 2 weight percent, including any ranges and subranges therebetween. Examples of a curing agent can include, but are not limited to, benzophenone, benzoin methyl ether, benzoin propyl ether, diethoxyacetophenone, 1-hydroxycyclohexyl phenyl ketone, 2,6-dimethylbenzoyldiphenylphosphine oxide, and 2,4,6-trimethylbenzoyldiphenylphosphine oxide. Two or more curing agents may be used in combination in the composition.

The composition is, in some embodiments, free of compounds that can generate volatile species during formation of the transparent composite film. The composition can be free of such compounds related to volatile species, for example, water or small organic compounds and organic solvents. The exclusion of organic solvent and water from the composition during formation thereof or before curing can eliminate or substantially reduce the generation of volatile species due to hydrolysis or condensation during the cure period.

The reduction or elimination in volatile species can be characterized in measurements of weight loss of the transparent composite film. In one or more embodiments, a thermogravimetric analysis as described in the Example section can be used to measure weight loss of the transparent composite film. The temperature at which 5 percent weight loss of the transparent composite film occurs can be about 260° C. or more, for example about 280° C. or more, or about 300° C. or more.

In some embodiments, the composition includes five or less, for example four or less components. For example, in some embodiments the composition may consist of a first oligomer, a second oligomer that is different than the first oligomer, a monomer and a curing agent as described herein.

The composition is, in some embodiments, in the liquid form at ambient conditions and before curing or formation of a cross-linked polymer network. For example, the composition can have a viscosity of less than about 200 poise, less than about 175 poise, for example less than about 150 poise, or less than about 125 or about 100 poise when measured at 25° C. Viscosities ranging above the noted ranges may not effectively wet the fiber filler and air bubbles can form in the cured film, which can further compromise the optical, thermal and physical properties of the film.

Transparent Composite Film

As shown in FIG. 1, a transparent composite film 10 includes a polymer network 2 having an embedded fiber filler 4, 6. The film 10 can have an average thickness equal to or less than about 500 micrometers (μm, or microns), including but not limited to thicknesses of, for example, about 20 to about 400 micrometers, about 50 to about 350 micrometers, about 100 to about 300 μm, about 125 to about 250 μm, or about 150 μm, about 175 μm, about 200 μm, or about 225 μm, including any ranges and subranges therebetween.

The polymer network 2 of the film 10 is, in some embodiments, a cross-linked polymer network containing a first structure segment and a second structure segment. The film 10 can be obtained from a cure of a composition containing a combination of oligomers (e.g., a first oligomer and a second oligomer) and a monomer as disclosed herein. The polymer network 2 forms at least a first surface 10a and a second surface 10b of the transparent composite film 10. The first surface 10a and the second surface 10b, in some embodiments, have a smooth and uniform surface. For example, the first surface 10a, the second surface 10b, or a combination thereof, can have an average surface roughness, Ra, of about 50 nm or less, about 40 nm or less, for example about 30 nm or less, or about 20 nm or less, or about 10 nm or less.

The fiber filler 4, 6 can be made of glass fibers. As shown, the fiber filler is a flat, horizontal woven fabric or cloth of glass fibers 4, 6 embedded within the polymer network 2. In some embodiments, the fiber filler is entirely covered by the polymer network 2 and embedded at or near the middle or center of the thickness of the polymer network 2. The fiber filler can have an average thickness equal to or less than about 400 micrometers (μm, or microns), including but not limited to thicknesses of, for example, about 10 to about 300 micrometers, about 20 to about 200 micrometers, about 25 to about 150 μm, about 50 to about 125 μm, about 75 μm, or about 100 μm, including any ranges and subranges therebetween. The fiber filler can alternatively include two or more fiber fillers, for example, two or more woven fabrics (not shown).

The average thickness of the fiber filler 4, 6 can be expressed in relation to the average thickness of the film 10. For example, the average thickness of the fiber filler is about 15% or more, for example about 30% or more, or about 45% or more, of the average total thickness of the film. In other embodiments, the average total thickness of the film can compared to the average thickness of the fiber filler. For example, the average total thickness of the film can be about 5% or more greater, or about 50% or more greater, or about 100% or more greater, than the average thickness of the fiber filler.

The film 10 can be obtained from a cure of a composition containing a combination of oligomers (e.g., a first oligomer and a second oligomer) and a monomer as disclosed herein.

Production of the Transparent Composite Film

The transparent composite film can be prepared by any suitable method. Suitable production methods can include, but are not limited to, vacuum bag molding, doctor blade extrusion and dipping into resin matrix followed by shaping, e.g., between a base support and a top cover. Treated glass or polymer release films having low roughness surfaces can be used as the base support, top cover, or both. Thickness of the transparent composite film can be controlled by conventional techniques. For example, a dimensionally stable spacer material (e.g., a metal or polymer adhesive) can be used. In another example, a roller or lamination apparatus can be used to remove trapped air out and form a thin sheet for curing.

In some embodiments, the transparent composite film is compatible with and formed with a roll-to-roll manufacturing process. Production with a roll-to-roll manufacturing process can include at least the following steps. In a first step, a composition for wetting the fiber filler and forming a polymer network is formed. In some examples, a composition can be formed by mixing a first oligomer, a second oligomer, a monomer and a curing agent to form a well-mixed or dispersed mixture. Heat can optionally be applied to the composition during mixing. To better facilitate wetting of the fiber filler, the mixed composition can be held at an elevated temperature. In some examples, the composition can be held at a temperature in the range of about 40° to about 80° C., for example about 50° C. to about 70° C., to reduce the viscosity of the composition for application to the fiber filler (e.g., a glass fiber cloth).

A release film can be used, for example in the form of a roll on a convey belt system, as a base material for applying a portion of the composition (e.g., about half of the total amount of composition being used to form the film). Release films having a low surface roughness are beneficial in some embodiments. An example of a release film is a polyethylene terephthalate film, which can be optionally coated with a hydrophobic acrylic layer. The composition can be applied evenly over the base material by a suitable method. A trough or nozzles can be used to coat the base material with a portion of the composition. A pre-determined amount of the composition can be applied to achieve a desired thickness on the base material.

Fiber filler can be positioned on top of the liquid coating of the composition on the base material. In an example, a roll of woven fabric of glass fibers can be applied to the liquid coating such that the fabric sits on top of the coating on the base material.

An additional amount of composition can be applied to the fiber filler in contact with the portion of the composition on the base material. For example, a pre-determined amount of liquid composition can be applied evenly on top of the fiber filler resting on the release film to achieve a desired film thickness. The application of a second portion of the composition forms an uncured composite film having an embedded fiber filler therein.

In another step, a second release film can be applied to the exposed surface of the uncured composite film opposite the first release film to form an uncured composite film sandwiched between release layers, namely, a release film/uncured composition/fiber filler/uncured composition/release film stack. The stack can be transferred through a pair of rollers to form an uncured composite film having a uniform thickness. To cure the transparent composite film, an energy source can be applied to the composition as described in the present disclosure. Examples of radiation curing energy sources include ultraviolet light or electron beam. The formed transparent composite film can be collected and separated from the release films.

Figure 5A:
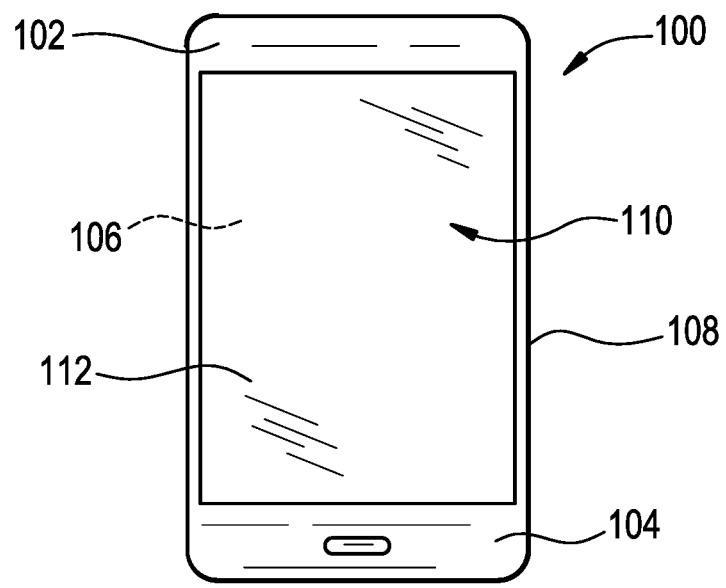
FIG. 5A is a plan view of an exemplary electronic device incorporating any of the strengthened articles disclosed herein.
Figure 5B:
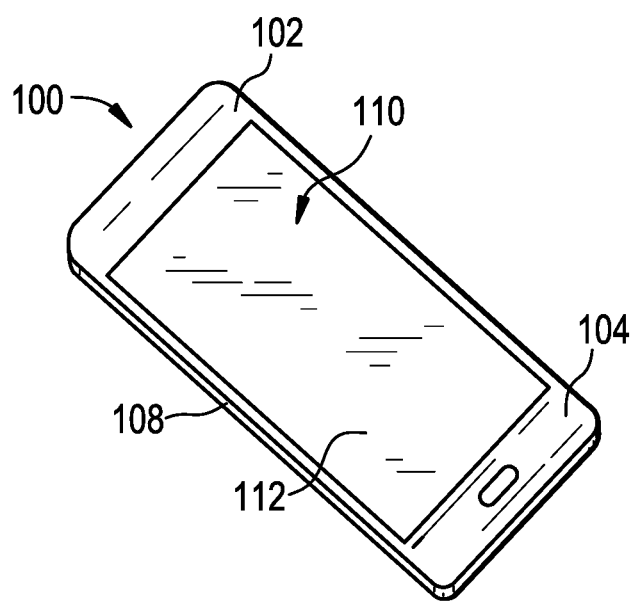
FIG. 5B is a perspective view of the exemplary electronic device of FIG. 5A.

The transparent composite film disclosed herein may be incorporated into another article such as an article with a display (or display articles) (e.g., consumer electronics, including mobile phones, tablets, computers, navigation systems, foldable display, wearable devices (e.g., watches) and the like), architectural articles, transportation articles (e.g., automotive, trains, aircraft, sea craft, etc.), appliance articles, or any article that would benefit from some transparency, scratch-resistance, abrasion resistance, puncture resistance, and/or flexibility, or a combination thereof. An exemplary article incorporating any of composite films disclosed herein is shown in FIGS. 5A and 5B. Specifically, FIGS. 5A and 5B show a consumer electronic device 100 including a housing 102 having front 104, back 106, and side surfaces 108; electrical components (not shown) that are at least partially inside or entirely within the housing and including at least a controller, a memory, and a display 110 at or adjacent to the front surface of the housing; and a cover substrate 112 at or over the front surface of the housing such that it is over the display. In some embodiments, the cover substrate 112 may include any of the transparent composite films disclosed herein. In some embodiments, at least one of a portion of the housing or the cover glass comprises the transparent composite films disclosed herein.

EXAMPLES

Measurements provided in the present disclosure and in the examples herein are based on the following test procedures.

Average Linear Coefficient of Thermal Expansion (i.e. CTE)

The average linear coefficient of thermal expansion is measured using a TA Q400 Thermal Mechanical Analyzer (TMA) with a heating rate of 5° C./min and a temperature range of 30 to 250° C.

Light Transmittance

The measurement of total light transmittance is conducted using PerkinElmer Lambda 950 UV-Vis-NIR Spectrophotometer in the wavelength range from 330 to 800 nm.

Thermogravimetric Analysis (TGA)

A sample is heated to 500° C. or more at a heating rate of 10° C./minute in air using Netzsch STA449C Jupiter TGA instrument. The temperature at which the weight of the sample is decreased by 5% based on the original weight is recorded along with the first weight loss onset temperature.

Glass Transition Temperature (Tg)

Measurements are made on DMTA IV from Rheometric Scientific. The maximum value of tanδ at 1 Hz is recorded as the glass transition temperature.

Refractive Index

Refractive Index (RI) measurements on the uncured (liquid) coatings are performed on a Milton Roy LE07 refractometer water-cooled to a constant 25° C. temperature.

Tensile Properties

Tensile properties are measured using an Instron 5500R tensile tester. The gauge length used for testing was 5.1 cm and the test speed was 2.5 cm/minute. Tensile strength, stress at yield point (where yielding was significant), % elongation at break, and Young's Modulus values are recorded.

Resistance to Bending

The transparent composite film is rolled on a T-pin having a diameter of 1.2 mm. A yes or no is recorded depending on if either cracking or visible optical distortion is observed. Examples 1 to 6 and comparative examples 1 to 5 all exhibited either no cracking or visible optical distortion. The polymer film of comparative example 6 did not pass the resistance to bending test.

Example 1

Figure 2:
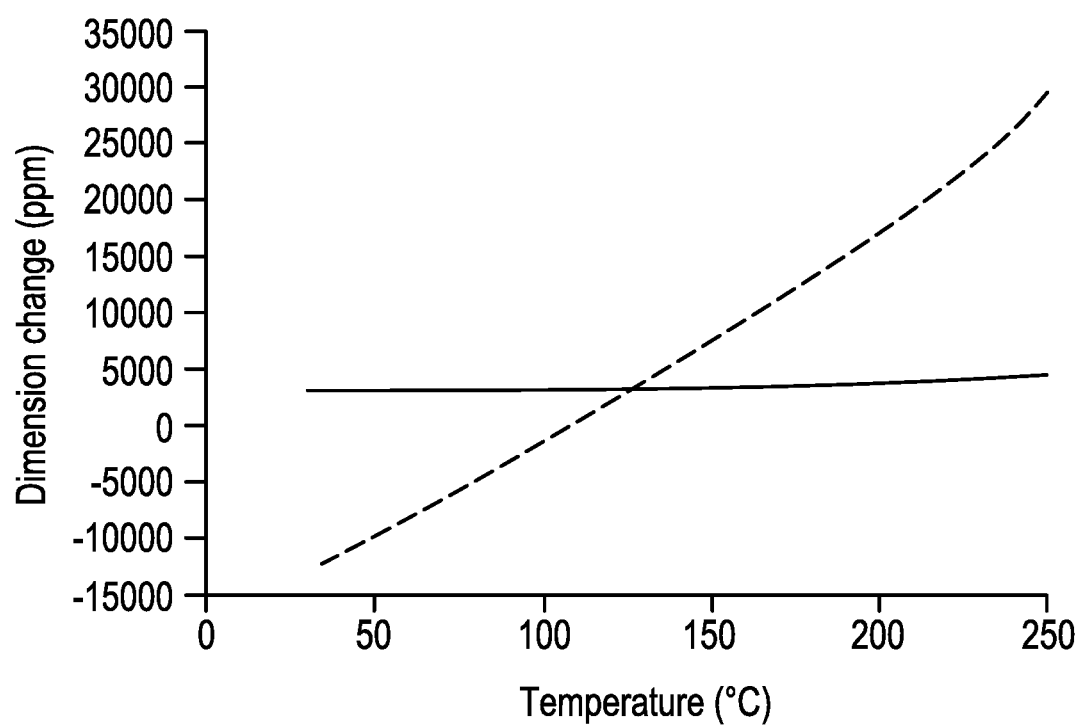
FIG. 2 is a graph of the coefficient of thermal expansion of a transparent composite film and a polymer film according to one or more embodiments.

A resin composition composed of 61.5 weight percent (i.e. wt %) of M2100 (ethoxylated (10) bisphenol A diacrylate, refractive index 1.516, Miwon Specialty Chemical Co., Ltd), 22 wt % of PE210HA (bisphenol A epoxy acrylate, refractive index 1.562, Miwon Specialty Chemical Co., Ltd), 15 wt % of M1142 (o-Phenylphenol ethyl acrylate, refractive index 1.577, Miwon Specialty Chemical Co., Ltd), and 1.5 wt % of Omnirad TPO-L photo-initiator (diphenyl (2,4,6-trimethylbenzoyl) phosphine oxide, BASF Canada Inc.) was prepared by mixing in a glass jacketed beaker at 60-65° C. until homogeneous. A portion of this resin composition was placed on a release film, a woven glass fabric (1080 E-glass, 40 µm thick, and refractive index 1.560, available from Jushi Group Co., Ltd., a Chinese limited company with offices at 669 Wenhua Road (south), Economic Development Zone, Tongxiang Zhejiang 314500 China) was placed on top of the resin-coated release film, and a second portion of the resin was placed on top of the woven glass fabric. Wetting continued at about 60° C. for 30 minutes. The transparent composite film was covered by another layer of the release film. Slight excess amount of resin was used to fully wet the glass fabric. A shim material was used to control the thickness and a handheld roller was used to remove the air bubbles and excess amount of resin liquid. The film was then cured using a Fusion UV 300W "D" bulb lamp at 50% power (UV intensity 2000 mW/cm$^2$) with a nitrogen purge. The film received a dose of approximately 1250 mJ/cm$^2$. The cured film was allowed to condition overnight in a controlled environment at 23° C. and 50% relative humidity before testing. The transparent composite film thus fabricated has a thickness of 132 µm. Film properties are shown in Tables 1 and 2. The coefficient of thermal expansion curve is shown as the solid line in FIG. 2. As can be seen in FIG. 2, the dimensional change for the transparent composite film of Example 1 for a temperature range of 50° C. to 250° C. is substantially less as compared to the polymer film of Comparative Example 3(dashed line in FIG. 2).

Example 2

Figure 3:
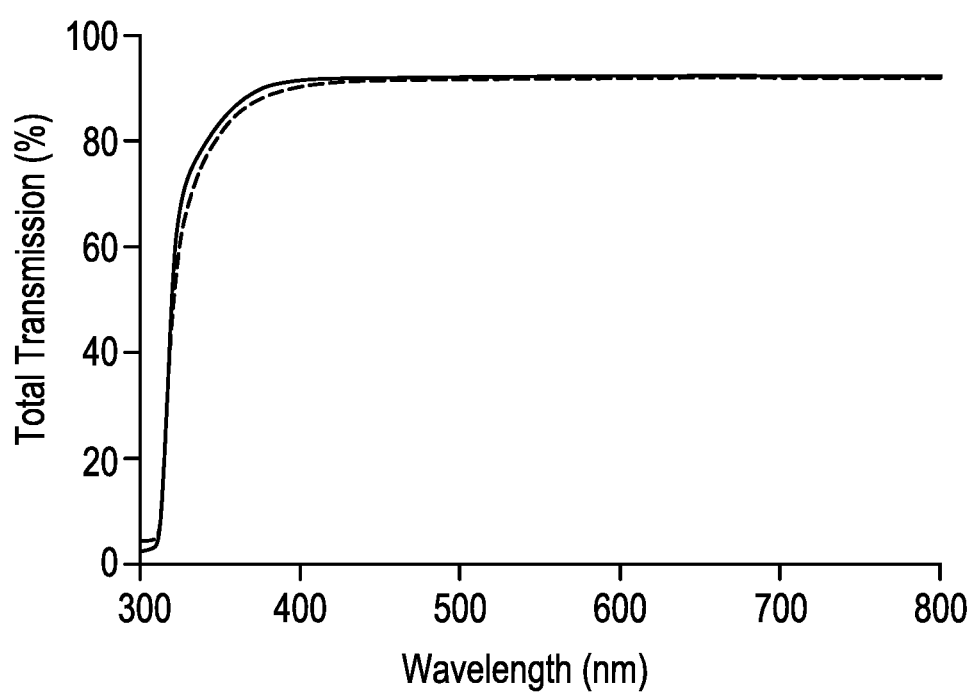
FIG. 3 is a graph of the total transmission of a transparent composite film and a polymer film according to one or more embodiments.
Figure 4:
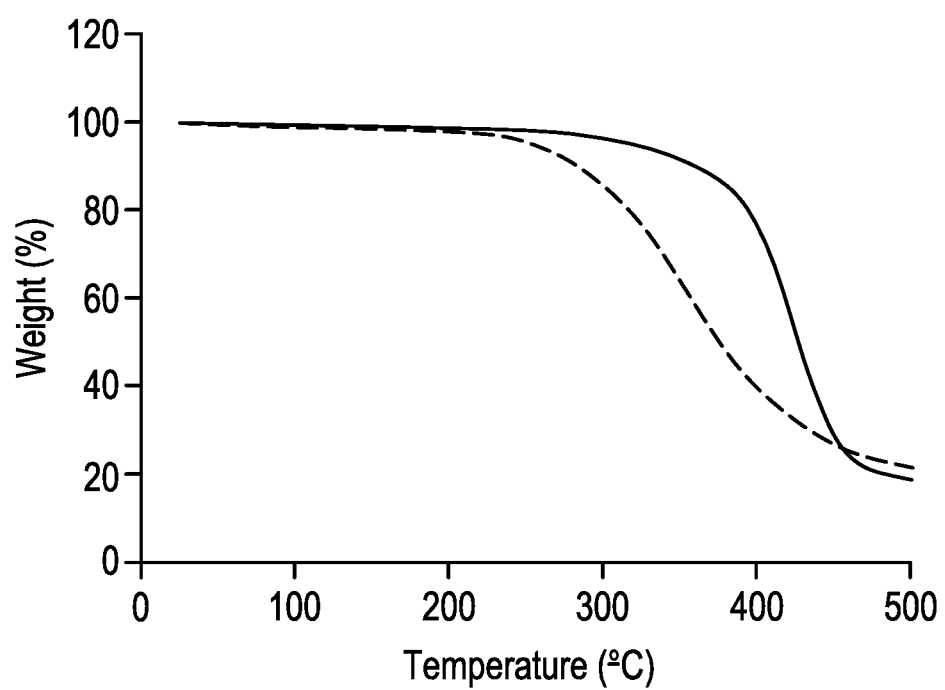
FIG. 4 is a graph of the thermogravimetric analysis (TGA) of a transparent composite film and a polymer film according to one or more embodiments.

A resin composition composed of 66.5 wt % of M2100 (ethoxylated (10) bisphenol A diacrylate, refractive index 1.516, Miwon Specialty Chemical Co., Ltd), 22 wt % of PE210HA (bisphenol A epoxy acrylate, refractive index 1.562, Miwon Specialty Chemical Co., Ltd), 10 wt % of M1142 (o-Phenylphenol ethyl acrylate, refractive index 1.577, Miwon Specialty Chemical Co., Ltd), and 1.5 wt % of Omnirad TPO-L photo-initiator (diphenyl (2,4,6-trimethylbenzoyl) phosphine oxide, BASF Canada Inc.) was prepared by mixing in a glass jacketed beaker at 60-65° C. until homogeneous. A transparent composite film was prepared in the same way as stated in Example 1 except that the thickness of the film was 182 µm. Film properties are shown in Tables 1 and 2. The total transmission and glass transition temperature of the transparent composite film are shown in FIGS. 3 and 4, respectively (solid line in each figure).

Example 3

A transparent composite film was prepared in the same way as stated in Example 1 except that the thickness of the film was 165 µm. Film properties are shown in Tables 1 and 2.

Example 4

A resin composition composed of 56.5 wt % of M2100 (ethoxylated (10) bisphenol A diacrylate, refractive index 1.516, Miwon Specialty Chemical Co., Ltd), 22 wt % of PE210 (bisphenol A epoxy diacrylate, refractive index 1.557, Miwon Specialty Chemical Co., Ltd), 20 wt % of M1142 (o-Phenylphenol ethyl acrylate, refractive index 1.577, Miwon Specialty Chemical Co., Ltd, Korea), and 1.5 wt % of Omnirad TPO-L photo-initiator (diphenyl (2,4,6-trimethylbenzoyl) phosphine oxide, BASF Canada Inc.) was prepared in the same way as stated in Example 1. A transparent composite film with a thickness of 356 µm was prepared and film properties are shown in Tables 1 and 2.

Example 5

A transparent composite film with a thickness of 279 µm was prepared in the same way as stated in Example 4 and film properties are shown in Tables 1 and 2.

Example 6

A transparent composite film with a thickness of 124 µm was prepared in the same way as stated in Example 4 and film properties are shown in Tables 1 and 2.

Comparative Example 1

A transparent polymer film with a thickness of 104 µm was prepared in the same way as stated in Example 2 except that no woven glass fabric was used and a draw bar was used to control the film thickness. Film properties are shown in Tables 1 and 2. The total transmission and glass transition temperature of the transparent polymer film are shown in FIGS. 3 and 4, respectively (dashed line in each figure).

Comparative Example 2

A transparent composite film with a thickness of 528 µm was prepared in the same way as stated in Example 2 and film properties are shown in Tables 1 and 2.

Comparative Example 3

A transparent polymer film with a thickness of 123 µm was prepared in the same way as stated in Example 1 except that no woven glass fabric was used and a draw down bar was used to control the film thickness. Film properties are shown in Tables 1 and 2. The coefficient of thermal expansion curve of the polymer film is shown as the dotted line in FIG. 2.

Comparative Example 4

A transparent composite film with a thickness of 361 µm was prepared in the same way as stated in Example 1 and film properties are shown in Tables 1 and 2.

Comparative Example 5

A transparent polymer film with a thickness of 120 µm was prepared in the same way as stated in Example 4 except that no woven glass fabric was used and a draw down bar was used to control the film thickness. Film properties are shown in Tables 1 and 2.

Comparative Example 6

A resin composition composed of 78.5 wt % of M240 (ethoxylated (4) bisphenol A diacrylate, refractive index 1.537, Miwon Specialty Chemical Co., Ltd), 20 wt % of PE210ET (bisphenol A epoxy diacrylate, refractive index 1.557, Miwon Specialty Chemical Co., Ltd), and 1.5 wt % of Omnirad TPO-L photo-initiator (diphenyl (2,4,6-trimethylbenzoyl) phosphine oxide, BASF Canada Inc.) was prepared in the same way as stated in Example 1. A transparent polymer film with a thickness of 66 µm was prepared using a draw down bar and film properties are shown in Tables 1 and 2.

TABLE 1

|  | M2100 (wt %) | PE210 (wt %) | PE210HA (wt %) | M1142 (wt %) | M240 (wt %) | PE210ET (wt %) | Fiber Thickness in Film (%) |
|---|---|---|---|---|---|---|---|
| Refractive Index | 1.516 | 1.557 | 1.562 | 1.577 | 1.537 | 1.557 |  |
| Example 1 | 61.5 | 0 | 22 | 15 | 0 | 0 | 30 |
| Example 2 | 66.5 | 0 | 22 | 10 | 0 | 0 | 22 |
| Example 3 | 61.5 | 0 | 22 | 15 | 0 | 0 | 24 |
| Example 4 | 56.5 | 22 | 0 | 20 | 0 | 0 | 11 |
| Example 5 | 56.5 | 22 | 0 | 20 | 0 | 0 | 14 |
| Example 6 | 56.5 | 22 | 0 | 20 | 0 | 0 | 32 |
| Comp. Example 1 | 66.5 | 0 | 22 | 10 | 0 | 0 | 0 |
| Comp. Example 2 | 66.5 | 0 | 22 | 10 | 0 | 0 | 8 |
| Comp. Example 3 | 61.5 | 0 | 22 | 15 | 0 | 0 | 0 |
| Comp. Example 4 | 61.5 | 0 | 22 | 15 | 0 | 0 | 11 |
| Comp. Example 5 | 56.5 | 22 | 0 | 20 | 0 | 0 | 0 |
| Comp. Example 6 | 0 | 0 | 0 | 0 | 78.5 | 20 | 0 |

TABLE 2

|  | Tensile Strength (MPa) | Young's Modulus (MPa) | Elongation at Break (%) | Film Transm. 550 nm (%) | 5% wt loss Temp (° C.) | Film Thickness (μm) | CTE (ppm/° C.) | Tg (° C.) | Ra (nm) |
|---|---|---|---|---|---|---|---|---|---|
| Ex 1 | 65 | 2175 | 7 | 91 |  | 132 | 6 |  | 3 |
| Ex 2 |  |  |  | 92 | 320 | 182 |  |  | 5 |
| Ex 3 |  |  |  |  |  | 165 |  | 24 |  |
| Ex 4 | 44 | 1125 | 29 | 91 |  | 356 |  | 23 |  |
| Ex 5 | 59 | 1277 | 31 |  |  | 279 |  |  |  |
| Ex 6 | 52 | 1717 | 9 |  | 285 | 124 | 19 | 35 | 5 |
| Comp Ex 1 | 4 | 18 | 31 | 92 | 255 | 104 |  | 20 |  |
| Comp Ex 2 | 22 | 476 | 8 | 92 |  | 528 |  |  |  |
| Comp Ex 3 | 7 | 22 | 52 | 92 | 255 | 123 | 193 | 20 |  |
| Comp Ex 4 | 28 | 462 | 8 | 91 | 262 | 361 |  |  |  |
| Comp Ex 5 | 21 | 403 | 38 | 91 | 268 | 120 | 199 | 34 |  |
| Comp Ex 6 | 28 | 1415 | 2.1 |  |  | 66 |  |  |  |

In Table 1, "Fiber thickness in film" is the thickness of the fiber filler as a percent of the transparent composite film thickness. The roughness Ra is average surface roughness.

As shown in Table 2, the tensile strength, Young's elastic modulus and 5% wt loss temperature (° C.) increased in the transparent composite film as compared to the polymer film of the comparative examples.

Regarding tensile strength, the transparent composite films of examples 1 and 4-6 exhibited a tensile strength in the range of 44 to 65 MPa for films having a thickness in the range of 124 to 356 μm with a fiber thickness in the film in the range of 11 to 32 percent. The tensile strength of the polymer film of the comparative examples was in the range of 4 to 28 MPa and thus the transparent composite films exhibited an improved tensile strength in the range of 57 to 132 percent as compared to the fiberless polymer films. In one example, the thicknesses of the polymer film of comparative example 3 and the transparent composite film of example 6 were nearly identical (i.e. 123 μm and 124 μm, respectively) but the transparent composite film exhibited an increase in tensile strength of about 642 percent as compared to the polymer film.

The elastic modulus of the transparent composite films of examples 1 and 4-6 was in the range of 1125 to 2175 MPa for films having a thickness in the range of 124 to 356 μm with a fiber thickness in the film in the range of 11 to 32 percent. The elastic modulus of the polymer film of the comparative examples having a thickness of at least about the minimum thickness of the transparent composite films was in the range of 18 to 462 MPa (i.e. comparative examples 1-5). Thus, the transparent composite films exhibited an improved elastic modulus in the range of 143 to 370 percent as compared to the fiberless polymer films. In one example, the thicknesses of the polymer film of comparative example 3 and the transparent composite film of example 6 were nearly identical (i.e. 123 μm and 124 μm, respectively) but the transparent composite film exhibited an increase in elastic modulus of about 7,704 percent as compared to the polymer film.

The transmission of the transparent composite film remained the same or varied within one degree (1° C.) or within 1% as compared to the polymer film of the comparative examples. The transparent composite films of examples 1, 2 and 4 exhibited a transmission of above 90 over a film thickness in the range of 132 to 356 μm with a fiber thickness in the film in the range of 11 to 30 percent. Thus, the transparent composite films of the present disclosure routinely provide equal transmissivity as compared to fiberless polymer films while also exhibiting improved tensile strength, elastic modulus and coefficient of thermal expansion.

As further shown in Table 2, the coefficient of thermal expansion for the transparent composite film decreased as compared to the polymer film of the comparative examples. For example, the coefficient of thermal expansion of the transparent composite film was in the range of 6 to 19 ppm/° C. for films having a thickness in the range of 124 to 132 μm with a fiber thickness in the film in the range of 30 to 32 percent. The coefficient of thermal expansion of the polymer film of the comparative examples was in the range of 193 to 199 ppm/° C. and thus the transparent composite films exhibited reduced coefficient of thermal expansion in the range of 915 to 947 percent as compared to the fiberless polymer films. In one example, the thicknesses of the polymer film of comparative example 3 and the transparent composite film of example 6 were nearly identical (i.e. 123 μm and 124 μm, respectively) but the transparent composite film exhibited a reduced coefficient of thermal expansion of about 915 percent as compared to the polymer film.

It will be apparent to those skilled in the art that various modifications and variations can be made to the examples disclosed herein without departing from the spirit and scope of the claimed subject matter. Many variations and modifications may be made to the above-described examples without departing substantially from the spirit and various principles described. All such modifications and variations are intended to be included herein within the scope of this disclosure and protected by the following claims.

What is claimed is:

1. A transparent composite film comprising a fiber filler embedded in a cross-linked polymer network, the network comprising a combination of a first structure segment of formula (1) or formula (2):

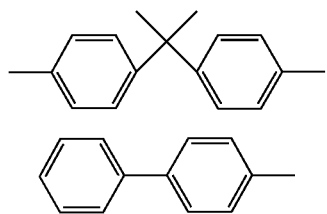

and a second structure segment of formula (3) or formula (4):

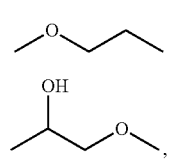

the cross-linked polymer network being obtained from a thermal or radiation cure of a composition comprising:
  a first oligomer comprising a refractive index lower than that of the fiber filler;
  a second oligomer comprising a refractive index higher than that of the first oligomer; and
  a monomer comprising a refractive index higher than that of the fiber filler,
  wherein the refractive index difference between the transparent cross-linked polymer network and the fiber filler is ≤ about 0.01.

2. A transparent composite film comprising a fiber filler embedded in a cross-linked polymer network, the network comprising a combination of a first structure segment of formula (1) or formula (2):

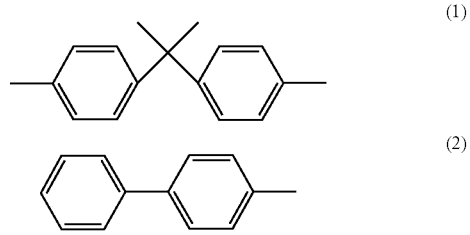

and a second structure segment of formula (3) or formula (4):

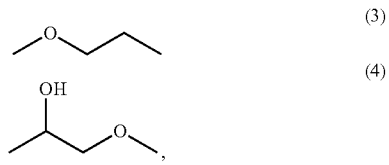

wherein the fiber filler comprises glass fibers or quartz fibers, wherein the fiber filler comprises a woven fabric, and wherein the woven fabric of fibers comprises an average thickness of about 200 μm or less and the fibers comprise an average diameter of about 25 μm or less.

3. The transparent composite film of claim 1, wherein at least one of the first oligomer, the second oligomer or the monomer comprises the first structure segment of formula (1) or formula (2).

4. The transparent composite film of claim 3, wherein each of the first oligomer, the second oligomer and the monomer comprises the first structure segment of formula (1) or formula (2).

5. The transparent composite film of claim 1, wherein at least one of the first oligomer, the second oligomer or the monomer comprises the second structure segment of formula (3) or formula (4).

6. The transparent composite film of claim 5, wherein each of the first oligomer, the second oligomer and the monomer comprises the second structure segment of formula (3) or formula (4).

7. The transparent composite film of claim 5, wherein the second structure segment of formula (3) or formula (4) further comprises at least one functional group.

8. The transparent composite film of claim 7, wherein the functional group comprises acrylate, methacrylate, epoxide or a combination thereof.

9. The transparent composite film of claim 1, wherein the first oligomer comprises a compound of formula (5):

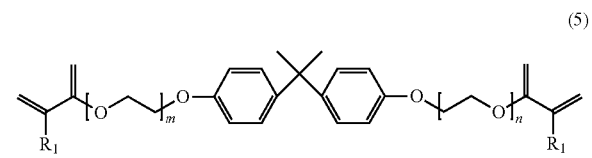

wherein m=3 to 8, m+n=5 to 16, and $R_1$=H or methyl.

10. The transparent composite film of claim 1, wherein the second oligomer comprises a compound of formula (6):

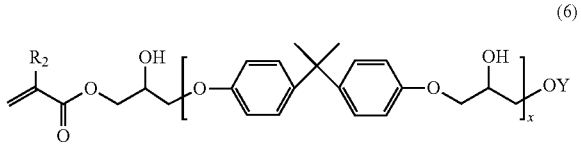
(6)

wherein x=0 to 2, $R_2$=H or methyl, and Y is a compound of formula (7) or (8)

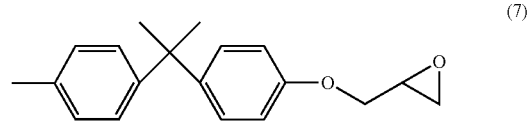
(7)

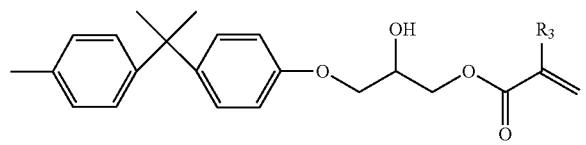
(8)

wherein $R_3$ is H or methyl.

11. The transparent composite film of claim 1, wherein the monomer comprises a compound of formula (9):

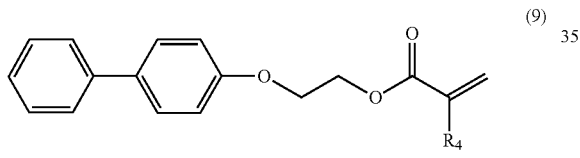
(9)

wherein $R_4$ is H or methyl.

12. The transparent composite film of claim 1, wherein the monomer is mono functional.

13. The transparent composite film of claim 1, wherein the composition comprises about 30 to about 80 weight percent of the first oligomer, about 10 to about 35 weight percent of the second oligomer and about 10 to about 35 weight percent of the monomer, wherein the weight percent of the first oligomer, the second oligomer, and the monomer, are each based on the total weight of the composition.

14. The transparent composite film of claim 13, wherein the composition further comprises about 0.5 to about 3 weight percent of a curing agent.

15. The transparent composite film of claim 1, wherein the composition comprises a weight ratio of the first oligomer to the second oligomer in the range of 8:1 to 1:1.

16. The transparent composite film of claim 1, wherein the composition comprises a weight ratio of the first oligomer to the monomer in the range of 8:1 to 1:1.

17. The transparent composite film of claim 1, wherein the composition comprises a weight ratio of the second oligomer to the monomer in the range of 3:1 to 1:3.

18. The transparent composite film of claim 1, wherein the composition is free of water.

19. The transparent composite film of claim 1, wherein the composition is free of an organic solvent.

20. The transparent composite film of claim 1, wherein the composition comprises a viscosity of about 200 poise or less at 25° C.

21. The transparent composite film of claim 1, wherein the transparent composite film comprises an average thickness in the range of about 20 to about 500 μm.

22. The transparent composite film of claim 1, wherein the transparent composite film comprises a first surface, the first surface comprises an average surface roughness Ra of about 50 nm or less.

23. The transparent composite film of claim 1, wherein the transparent composite film comprises an average linear coefficient of thermal expansion of about 20 ppm or less within the temperature range of 20° C. to 250° C.

24. The transparent composite film of claim 1, wherein the transparent composite film comprises a glass transition temperature of about 80° C. or less.

25. A transparent composite film comprising a fiber filler embedded in a cross-linked polymer network, the network comprising a combination of a first structure segment of formula (1) or formula (2):

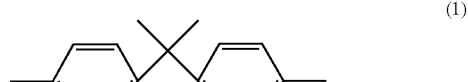
(1)

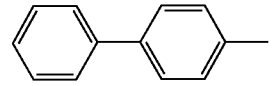
(2)

and a second structure segment of formula (3) or formula (4):

(3)

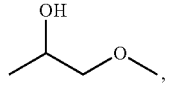
(4)

wherein the fiber filler is a woven fabric of glass fibers and the fabric comprises an average thickness of about 15% or more of the average total thickness of the transparent composite film.

26. The transparent composite film of claim 25, wherein the average total thickness of the transparent composite film is about 5% or more greater than the average thickness of the fabric.

27. The transparent composite film of claim 25, wherein the transparent composite film comprises a transmission of about 80% or more to light with a wavelength of 550 nm.

28. The transparent composite film of claim 25, wherein the transparent composite film comprises a tensile strength of about 30 MPa or more.

29. The transparent composite film of claim 25, wherein the transparent composite film comprises a modulus of elasticity of about 500 MPa or more.

30. The transparent composite film of claim 25, wherein the transparent composite film comprises an elongation at break of about 3% or more.

31. A consumer electronic product, comprising:
a housing having a front surface, a back surface and side surfaces;
electrical components provided at least partially within the housing, the electrical components including at least a controller, a memory, and a display, the display being provided at or adjacent the front surface of the housing; and
a cover material disposed over the display,
wherein at least one of a portion of the housing or the cover material comprises the transparent composite film of claim 1.

* * * * *